United States Patent Office 3,460,036
Patented Aug. 5, 1969

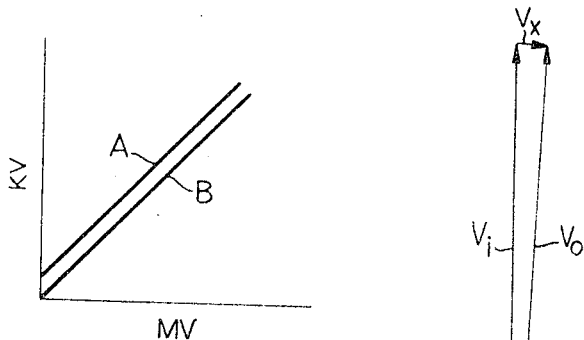
Fig. 4
Fig. 3
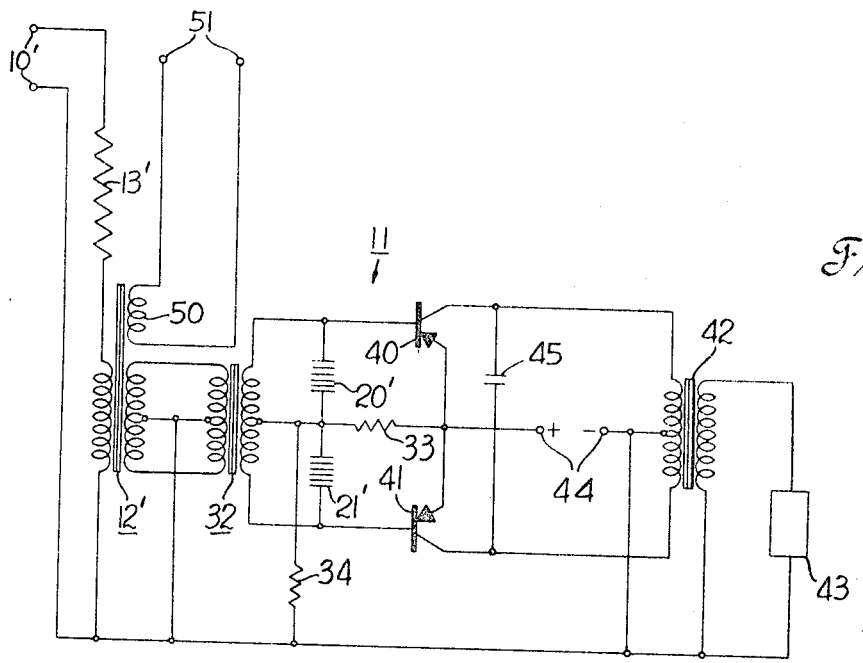
Fig. 2
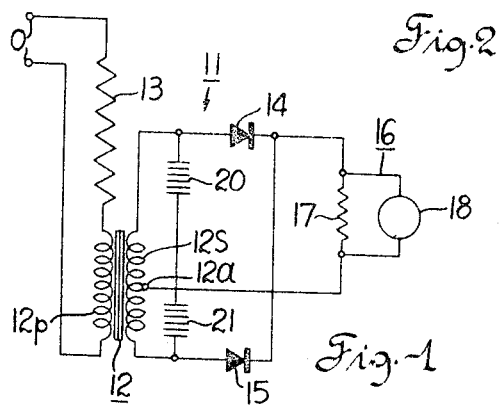
Fig. 1

3,460,036
POTENTIAL INDICATING DEVICE INCLUDING SERIALLY CONNECTED NONINDUCTIVE RESISTOR AND CURRENT TRANSFORMER
John Baude, Milwaukee, Wis., assignor to Allis-Chalmers Manufacturing Company, Milwaukee, Wis.
Continuation of application Ser. No. 617,726, Feb. 21, 1967, which is a continuation of application Ser. No. 283,421, May 27, 1963. This application Dec. 4, 1968, Ser. No. 784,534
Int. Cl. G01r 21/06
U.S. Cl. 324—127
9 Claims

ABSTRACT OF THE DISCLOSURE

Means for measuring the voltage of a power circuit in the range above ten kilovolts has the primary winding of a current transformer connected in series with a noninductive resistor across the power circuit, the resistor and primary winding being selected so that the resistive voltage drop across the former is at least 1,000 times the reactive voltage drop across the latter. Means provided for measuring the output from the current transformer secondary winding may comprise means for rectifying the secondary winding current and an ammeter coupled to the output of the rectifying means. Substantially all of the voltage drop occurs across the resistor so that the magnetic core of the current transformer is operated in nonsaturated condition and provides an output linearly proportional to the input with negligible phase shift between input and output.

---

This application is a continuation of my parent application Ser. No. 283,421 filed May 27, 1963 and my continuation application Serial No. 617,726 filed February 21, 1967, both now abandoned.

This invention relates to voltage measuring devices, particularly devices that are utilized to measure voltages of high voltage AC power sources.

The measuring of voltages of high voltage power circuits, i.e., in the general range of 10 kilovolts and higher, is usually accomplished with high voltage transformers for transforming the high voltages to lower voltages that can be more easily handled. High voltage transformers have three important disadvantages. First, they introduce a phase shift between the AC source and the output to be measured; second, they are expensive; and, third, they require an excessive amount of space.

In some applications it is necessary or desirable to avoid a significant phase shift between primary and secondary voltages. For example, when the output is used to trip fast acting relays it is desirable to have this occur as soon as possible after the sensing of a fault condition. If the fault condition occurs at one point in the cycle of the AC power supply and the output is out of phase the tripping may not occur for a fraction of a cycle after the fault condition occurs.

Also, in devices that utilize the voltage and current to measure the total power consumed, such as watt hour meters, a correction factor for the phase relationship between the power source and the voltage measuring device must be made.

With a device according to this invention it is possible to achieve an output signal lineally proportional to the AC power source voltage and also substantially in phase with the power source. It offers additional advantages in that the measuring device circuitry is operated at a low voltage and is separated from the high voltage thereby eliminating high voltage hazard to operating and maintenance personnel. Also it enables surge protectors to be utilized in the circuitry.

The objects of this invention are to provide a new and improved voltage measuring device; to provide a compact high voltage measuring device of relatively low cost; to provide a voltage measuring device that functions at low voltage; to provide a high voltage measuring device that is effectively isolated from the AC power source; to provide a voltage measuring device that produces an output that may be readily amplified to any necessary level; to provide a high voltage measuring device that produces an output lineally proportional to the input; to provide a high voltage measuring device that produces an output substantially in phase with the AC power source; and to provide a high voltage measuring device that produces an output that is directly proportional to the AC power supply voltage; and to provide a high voltage measuring device that may utilize the higher accuracy of direct current meters to measure the voltage of the AC power source.

In FIG. 1 is a schematic drawing of a circuit embodying this invention;

FIG. 2 is a schematic drawing of another circuit embodying this invention;

FIG. 3 is an illustrative drawing of the phase relationship between the input and the output of the circuits shown in FIGS. 1 and 2; and FIG. 4 is a graph showing the relationship between the input voltage and the output voltage of the circuits shown in FIGS. 1 and 2.

Referring to FIG. 1 a high voltage power source 10 is connected to a measuring circuit or device 11. The device comprises a current transforming means such as a current transformer 12 and an impedance such as a resistor 13 having substantially no reactance such as a noninductive type resistor. The resistor and a primary winding of the current transformer are connected in series across the AC power source. Resistor 13 and primary winding 12p are selected so that the impedance or resistance of resistor 13 is very high, in the range of at least 1,000 times as great, as the impedance of the primary winding.

Device 11 also comprises a secondary winding 12s of the current transformer and means responsive to the output of the current transformer for producing an output proportional to the AC source voltage. The current transformer is a device known in the art and is defined as a relatively low impedance device that produces a current flow in its secondary winding that is proportional to the current flow in its primary winding. It primarily transforms current rather than voltage.

For proper linearity between the input and the output of the current transformer it is desirable and practically necessary that the current transformer be selected so that under the current conditions encountered it operates with its core in a nonsaturated condition.

By selecting the relationship of the primary winding to the secondary winding, the output of the current transformer may be an increased current flow. This allows sensing meters to be utilized that may require a certain minimum current flow for proper operation.

A means for measuring the output of the secondary winding is provided. This means comprises a means for rectifying the output from the secondary winding and an ammeter 16. The means for rectifying comprises rectifiers 14 and 15 connected to a center tap 12a on the secondary winding. By rectifying the AC from the secondary winding a DC meter, such as ammeter 16 comprising a relatively low resistance shunt 17 and a voltmeter 18, is connected to receive the rectified output and measure its voltage. Surge protectors 20 and 21 are connected across the outputs of the secondary of the current transformer to bypass any electrical surges.

The high voltage of source 10 appears across resistor 13 and primary winding 12p. Since the resistance of resistor 13 is very high relative to the resistance of the primary winding, almost all the voltage appears across the resistor. The secondary of the current transformer produces an output having a current flow proportional to the current flow through the primary winding of the current transformer.

The only phase shift occurring in the output will result from the inductance of the current transformer. This is illustrated in FIG. 3 where the input line is marked $V_i$, indicating the voltage of the AC power source; the inductance is marked $V_x$ indicating the voltage across the primary winding and causing the resultant phase shift; and, the output is marked $V_o$ indicating the output voltage of the device. Since the voltage appearing across the primary winding ($V_x$) is very small relative to voltage of the AC power source ($V_i$), the angle between lines $V_i$ and $V_o$ will be extremely small. Thus, the phase shift between the input and the output is relatively insignificant. The selection of this proportion of the resistances can be predicated upon the needed degree of limitation of phase shift and is particularly applicable to keep the phase shift to practically zero.

The relationship of the AC power source voltage and the output voltage is shown in FIG. 4 at line A. The input is given as kilovolts and the output as millivolts.

FIG. 2 shows an embodiment of the invention that enables line A in FIG. 4 to shift to the position of line B and also enables large loads such as banks of meters or relays to be controlled. FIG. 2 uses similar numbers for equivalent elements appearing in FIG. 1. In addition to a resistor 13′ and a current transformer 12′, as in FIG. 1, a second transformer 32 is shown to isolate AC power source transformer 12′ from the circuitry. The output of transformer 32 in connected similarly as in FIG. 1 but is here connected to a means for amplifying the output such as a class B push pull transistor amplifier comprising transistors 40 and 41. This output is coupled through an output transformer 42 to a load 43.

The push pull amplifier comprises a DC source 44, an equalizing capacitor 45, and control resistors 33 and 34. Surge protectors are connected across the secondary of transformer 32.

A tertiary winding 50 is connected to the transformer to enable compensation for the excitation current of the transformer. By passing an appropriate amout of current from a source 51 through the tertiary winding the relationship of the AC power source voltage and the output voltage may be moved to a simultaneous zero point as shown in line B in FIG. 4.

An advantage of the configuration shown in FIG. 2 is that the current flow through the primary winding can be stepped up in the secondary winding to control various indicating devices. Therefore, if the current flowing through the secondary winding, even when stepped up, is not sufficient to operate the load, it may be increased by the amplifier.

The embodiments of the invention in which an exclusive property or privilege is claimed are defined as follows:

1. Means for measuring the voltage of a high voltage alternating source comprising:

a current transformer having inductively linked primary and secondary windings, a resistor having a preselected very high resistance relative to the impedance of said primary winding and having substantially no reactance, said resistor and said primary winding being connected in series across said alternating source to produce in said secondary winding a current proportional to the alternating source voltage, and means for providing a measurement of the current in said secondary winding.

2. Means for measuring according to claim 1 wherein said current transformer has a magnetic core which is operated in a nonsaturated condition.

3. Means for measuring according to claim 2 wherein said means for providing includes means connected in series with said secondary winding for producing a rectified output that varies as a function of the current through the secondary winding.

4. Means for measuring according to claim 5 wherein said current transformer has a tertiary winding and an alternating electrical source is connected to the tertiary winding to compensate for excitation current requirements of the current transformer.

5. Means for measuring according to claim 2 wherein said resistor has a resistance at least approximately 1,000 times as large as the impedance of said primary winding.

6. Means for measuring according to claim 5 wherein said means for providing comprises a transistor amplifier connected across the secondary winding for producing an amplified output proportional to the current in the secondary winding.

7. Means for measuring according to claim 6 wherein said transistor amplifier is a class B push-pull transistor amplifier connected across the secondary winding of the current transformer.

8. Means for measuring according to claim 9 wherein said means for providing includes means for rectifying the output current from said secondary winding.

9. Means for measuring according to claim 1 wherein said resistor has a selected resistance at least approximately 1,000 times as large as the impedance of said primary winding.

References Cited

UNITED STATES PATENTS

| | | | |
|---|---|---|---|
| 1,706,139 | 3/1929 | Boyajian | 324—127 XR |
| 2,796,581 | 6/1957 | Jorgensen | 323—60 XR |
| 3,028,539 | 4/1962 | Wright | 324—127 XR |

FOREIGN PATENTS 336,862  10/1930  Great Britain.

RUDOLPH V. ROLINEC, Primary Examiner

A. E. SMITH, Assistant Examiner

U.S. Cl. X.R.

323—60